US005109316A

United States Patent [19]

Murphy

[11] Patent Number: 5,109,316

[45] Date of Patent: Apr. 28, 1992

[54] MULTIPLE OUTLET RECEPTACLE WITH CIRCUIT BREAKER AND CONTINUITY SWITCH MECHANISMS

[75] Inventor: Glenn L. Murphy, Oxford, Conn.

[73] Assignee: Hubbell Incorporated, Orange, Conn.

[21] Appl. No.: 637,581

[22] Filed: Jan. 4, 1991

[51] Int. Cl.[5] .......................... H02G 3/08; H02B 1/10

[52] U.S. Cl. ....................................... 361/357; 174/58; 200/51 R; 200/297; 307/112; 439/535; 361/114; 361/334

[58] Field of Search .................. 200/297, 51 R, 51.02, 200/51.04; 307/112, 113, 130, 131, 155; 439/535, 538, 536, 682; 174/53, 54, 57, 58; 361/334, 356, 357, 376, 425, 426, 428, 62, 114

[56] References Cited

U.S. PATENT DOCUMENTS

| | | | |
|---|---|---|---|
| 3,663,864 | 5/1972 | Carlson | 307/150 |
| 3,786,312 | 1/1974 | Roussard | 307/112 |
| 4,266,266 | 5/1981 | Sanner | 361/357 |
| 4,583,799 | 4/1986 | Wiley | 339/14 R |
| 4,875,871 | 10/1989 | Booty, Sr. | 439/209 |
| 4,978,318 | 12/1990 | Wiley | 439/536 |

OTHER PUBLICATIONS

Page 46 of Advertisement Brochure entitled, "The Strip", by Challenger.

Sales Publication entitled, "Prewired Industrial Outlet Strips".

Catalog entitled, "Circuit Breakers", by ETA.

*Primary Examiner*—Gerald P. Tolin

*Attorney, Agent, or Firm*—G. H. Telfer; M. R. Swartz

[57] ABSTRACT

A multiple outlet receptacle has a molded insulating body which includes multiple groups of internal contact elements disposed in the body and defining multiple electrical outlets adapted for receiving multiple outlet plugs. The receptacle also has a circuit breaker mechanism and a continuity switch mechanism mounted in the body and connected in series with one another and with an electrical power cord and each of the multiple electrical outlets for respectively protecting external electrical circuits plugged into the multiple electrical outlets and switching on and off external electrical circuits plugged into the multiple electrical outlets.

5 Claims, 3 Drawing Sheets

MULTIPLE OUTLET RECEPTACLE WITH CIRCUIT BREAKER AND CONTINUITY SWITCH MECHANISMS

CROSS REFERENCE TO RELATED APPLICATIONS

Reference is hereby made to the following applications dealing with related subject matter and assigned to the assignee of the present invention:

(1) "Multiple Outlet Receptacle And Mountings Therefor" by Wiley et al, assigned U.S. Ser. No. 340,198 and filed Apr. 19, 1989.

(2) "Multiple Outlet Receptacle With Surge Suppression" by Misencik et al, assigned U.S. Ser. No. 495,787 and filed Mar. 22, 1990.

(3) "Multiple Outlet Locking Receptacle" by Murphy et al, assigned U.S. Ser. No. 632,788 and filed Dec. 24, 1990.

BACKGROUND OF THE INVENTION

1. Field of the Invention

The present invention relates generally to electrical wiring devices and, more particularly, is concerned with a multiple outlet receptacle incorporating a circuit breaker and continuity switch.

2. Description of the Prior Art

A multiple outlet receptacle, such as disclosed in U.S. Pat. No. 4,583,799 to Wiley and assigned to the assignee of the present invention, has four outlets to permit four electrical appliances to be plugged in at one receptacle location. The receptacle may be used, for example, for office lighting applications where it would normally be installed in a ceiling recess fixture, such as an outlet box or concrete ring, or some other surface mounting. The receptacle is designed to have a shallow body of molded insulating material with an integral mounting flange at the rear edges of the body. Internal contact elements of the four outlets are located within respective quadrants of the housing portion of the body. A front face of the housing portion has four sets of plug blade receiving apertures for communicating with the internal contact elements of the four outlets. A rear closing plate of insulating material is configured to fit within the back edge of the housing portion substantially flush with the mounting flange and provides a substantially planar rear surface for the entire unit.

In the exemplary receptacle of the Wiley patent, first and second conductive plates are provided that rest within the housing portion of the receptacle body. The first conductive plate is configured as a ring and is located near the periphery of the unit while the second conductive plate is configured to fit within the first plate and can be made from the same piece of starting material as the first plate. The first and second plates respectively support first and second groups of internal contact elements for the corresponding four outlets. The first and second groups of internal contact elements extend forwardly and are aligned with corresponding arrays of plug apertures in the front face. For a grounding receptacle, a third conductive plate is provided, being located on the outside rear surface of the rear closing plate. The third conductive plate supports a third group of internal contact elements for the corresponding four outlets. The third group of internal contact elements extend through apertures in the closing plate.

The multiple outlet receptacle of the aforementioned patent has been successful in providing a compact, reliable, attractive, and easy-to-use unit, particularly in a surface mounting arrangement. This multiple outlet receptacle has been further improved by the incorporation of the features disclosed in the patent applications cross-referenced above. However, it has been perceived by the inventor herein that, with respect to the above-described multiple outlet receptacle, a need still exists for additional improvement in order to provide protection for circuits connected to the multiple outlets of the receptacle.

SUMMARY OF THE INVENTION

The present invention provides a multiple outlet receptacle designed to satisfy the aforementioned needs. The receptacle of the present invention incorporates features which provide protection for connected electrical circuits. This is desirable in many diverse industrial and commercial applications.

Accordingly, the present invention is directed to a multiple outlet receptacle which comprises: (a) a molded insulating body having a front face with plug blade receiving apertures formed therein; (b) means disposed in the body and aligned with the apertures in the front face for defining multiple electrical outlets for receiving multiple outlet plugs; (c) means for supplying electrical power being attached to the body; and (d) a circuit breaker mechanism and a continuity switch mechanism mounted in the body and connected in series with one another and with the electrical power supplying means and each of the multiple electrical outlets for respectively protecting external electrical circuits plugged into the multiple electrical outlets and switching on and off external electrical circuits plugged into the multiple electrical outlets.

More particular, the means for defining multiple electrical outlets includes multiple groups of internal contact elements disposed in the body and aligned with the apertures in the front face thereof. The circuit breaker mechanism and the continuity switch mechanism each has a pair of terminals connected in series with the contact elements and the electrical power supplying means. The circuit breaker mechanism also having a reset actuating element projecting from the body for access at the exterior thereof. The continuity switch mechanism also has an actuating element projecting from the body for access at the exterior thereof.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
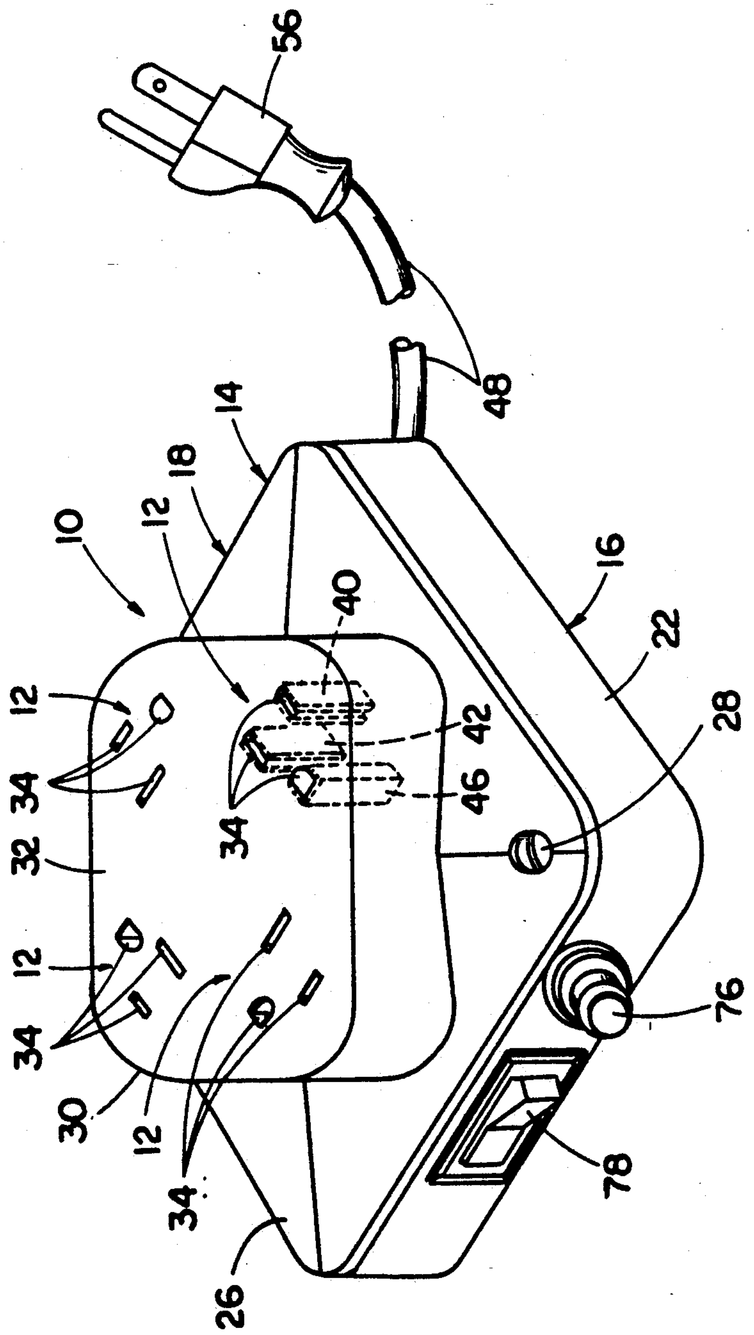
FIG. 1 is a perspective view of a multiple outlet receptacle of the present invention.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Figure 2:
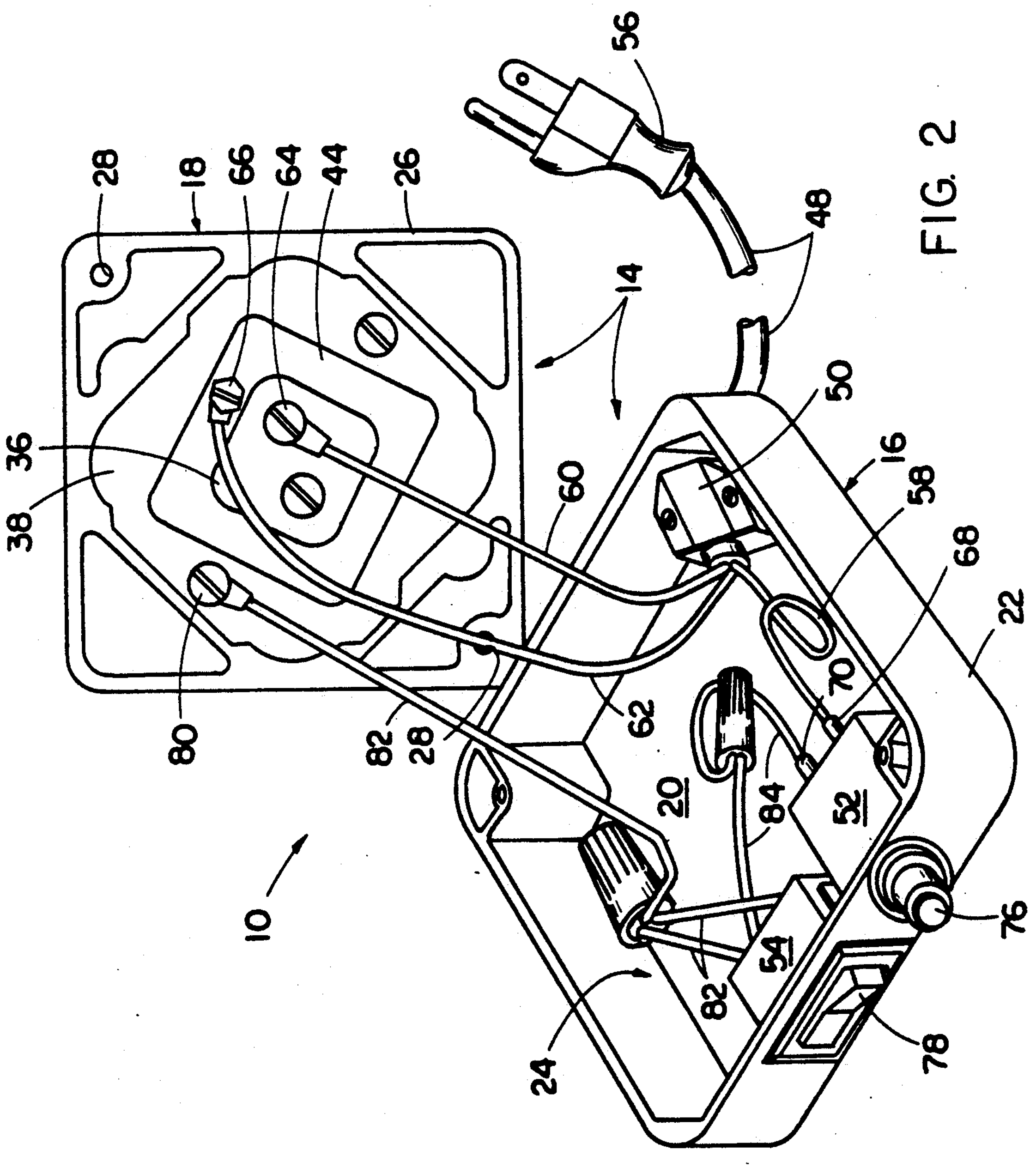
FIG. 2 is view similar to FIG. 1 but with the cover of the receptacle removed to show the interior thereof.

Referring now to the drawings, and particularly to FIGS. 1 and 2, there is illustrated a multiple outlet receptacle of the present invention, generally designated 10. In the illustrated embodiment, the receptacle 10 has four outlets 12 with one outlet arranged in each of four quadrants of the receptacle. Although four outlets are illustrated, outlets in other numerical arrangements can be provided.

The multiple outlet receptacle 10 includes a shallow molded insulating body 14 composed of a base 16 and a cover 18. The base 16 has a generally rectangular bottom wall 20 and a box-shaped continuous side wall 22 formed integrally with the bottom wall 20 and defining an open top 24. The cover 18 includes an annular mounting flange portion 26 with a pair of fastener receiving apertures 28 for detachably attaching the cover 18 to the base 16. The cover 18 also includes a top housing portion 30 formed integrally on the mounting flange portion 26. The housing portion 30 has a front face 32 with a plurality of arrays of plug blade receiving apertures 34 defined through it. The number of arrays of apertures 34 corresponding to the number of multiple outlets 12 accommodate insertion of the blades of multiple plugs into the respective multiple outlets.

Referring to FIG. 2, the multiple outlet receptacle 10 also includes first and second conductive plates 36, 38 disposed within the housing portion 30 of the receptacle body 14. The second or outer conductive plate 38 is configured as an annular ring and is located near the periphery of the housing portion 30, while the first or inner conductive plate 36 is configured as an central disk which fits within the outer ring plate 38 and can be made from the same piece of starting material as the first plate 36. The outer and inner plates 38, 36 respectively support first and second groups of internal contact elements 40, 42 for the corresponding four outlets 12. The first and second groups of internal contact elements 40, 42 are aligned with corresponding arrays of plug blade-receiving apertures 34 defined through the front face 32 of the housing portion 30.

Where the receptacle 10 is a grounding-type receptacle, a third conductive ground plate 44 is also provided. The ground plate 44 supports a third group of internal contact elements 46 for the corresponding four outlets. The third group of internal contact elements 46.

The multiple outlet receptacle 10 of the present invention also includes means for supplying electrical power in the form of an electrical power cord 48 attached to the body 14 by a cord grip 50, and a circuit breaker mechanism 52 and a continuity switch mechanism 54 each being mounted in the base 16 of the receptacle body 14. The electrical power cord 48 includes an electrical plug 56 and hot or live (H), neutral (N) and ground (G) electrical conductors 58, 60, 62 connected at their one ends to the plug 56. The neutral and ground conductors 60, 62 are connected at their opposite ends to the corresponding screw terminals 64, 66 on the inner and ground conductive plates 36, 44.

Figure 3:
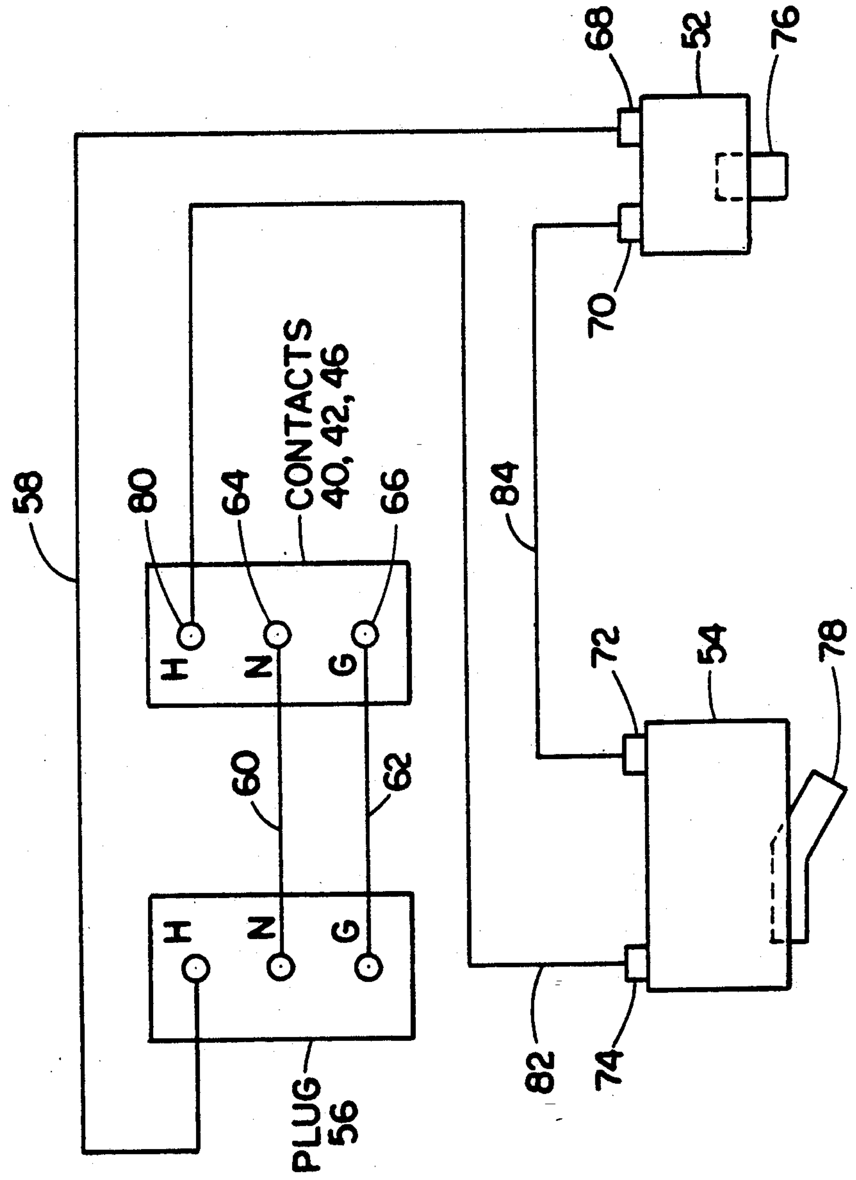
FIG. 3 is a schematic view of the circuit incorporated by the receptacle of FIG. 1.

Referring to FIGS. 2 and 3, the circuit breaker mechanism 52 and the continuity switch mechanism 54 each has a pair of terminals 68, 70 and 72, 74 connected in series with the power cord 48 and the contact elements 40, 42, 46 of the outlets 12. The circuit breaker mechanism 52 is mounted in the base 16 of the receptacle body 12 and has a reset actuating button 76 projecting from the base 16 for access at the exterior thereof. The circuit breaker mechanism 52 is reset by pushing in on the button 76. The continuity switch mechanism 54 also is mounted in the base 16 of the receptacle body 12 and has an actuating toggle switch 78 projecting from the base 16 for access at the exterior thereof. More particularly, the circuit breaker mechanism 52 and the continuity switch mechanism 54 are mounted in side-by-side relation to one another to the base 16 such that their respective reset actuating button 76 and actuating toggle switch 78 are positioned in side-by-side relation to one another and project from the molded insulating body 12 through the side wall 22 of the base 16. The switch 78 also contains a light (not shown) which turns off and on concurrently as the switch 78 is actuated off and on. The circuit breaker mechanism 52 and continuity switch mechanism 54 are conventional components per se. As examples, the circuit breaker mechanism 52 can be a Series-43-400-L10 and the continuity switch mechanism 54 can be a Series 41-10-P10, both available from E-T-A Circuit Breakers of Chicago, Illinois.

The live conductor 58 of the power cord 48 is connected to the one terminal 68 of the circuit breaker mechanism 52. A screw terminal 80 for the outer conductive plate 38 is connected by an electrical conductor 82 to the one terminal 74 of the continuity switch mechanism 54. Another conductor 84 interconnects in series the other terminals 70, 72 of the circuit breaker mechanism 52 and continuity switch mechanism 54. In such an arrangement, the circuit breaker mechanism 52 and the continuity switch mechanism 54 are connected in series with one another and with the electrical power cord 48 and each of the multiple electrical outlets 12 for respectively protecting external electrical circuits plugged into the multiple electrical outlets 12 and for switching on and off external electrical circuits plugged into the multiple electrical outlets 12.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A multiple outlet receptacle, comprising:
(a) a molded insulating body having a front face with plug blade receiving apertures formed therein;
(b) means disposed in said body and aligned with said apertures in said front face and defining multiple electrical outlets for receiving multiple outlet plugs;
(c) means for supplying electrical power being attached to said body; and
(d) a circuit breaker mechanism and a continuity switch mechanism mounted side-by-side one another in said body and connected in series with one another and with said electrical power supplying means and each of said multiple electrical outlets for respectively protecting external electrical circuits when plugged into said multiple electrical outlets and switching on and off external electrical circuits plugged into said multiple electrical outlets;

(e) said molded insulating body including a base having a bottom wall and a continuous side wall formed integrally with said bottom wall and defining an open top, said circuit breaker mechanism and said continuity switch mechanism being mounted in side-by-side position to said base and respectively having a reset actuating element and a switch actuating element being positioned side-by-side one another and projecting from said molded insulating body through said side wall of said base thereof for access at the exterior of said body;

(f) said body also including a cover separate from said base, said cover having a mounting flange portion detachably attached to said continuous side wall of said base so as to close said open top thereof, said cover also having a housing portion formed integrally on and projecting outwardly from said mounting flange portion, said housing portion containing said multiple electrical outlet defining means and having said front face with plug blade receiving apertures formed therein.

2. The receptacle as recited in claim 1, wherein said multiple electrical outlets include multiple groups of internal contact elements disposed in said housing portion of said body and aligned with said apertures in said front face of said housing portion.

3. The receptacle as recited in claim 2, wherein said circuit breaker mechanism and said continuity switch mechanism each has a pair of terminals connected in series with said contact elements and said electrical power supplying means.

4. The receptacle as recited in claim 3, further comprising:

a first electrical conductor interconnecting one of said terminals of said circuit breaker mechanism or said continuity switch mechanism and a first group of said internal contact elements; and a second electrical conductor interconnecting one of said terminals of said circuit breaker mechanism and one of said terminals of said continuity switch mechanism.

5. The receptacle as recited in claim 4, wherein said electrical power supplying means is an electrical power cord including an electrical plug and a pair of electrical conductors connected at one end to said plug, one of said conductors being connected at an opposite end to a second group of said internal contact elements and the other of said conductors being connected at an opposite end to the other of said terminals of said circuit breaker mechanism or said continuity switch mechanism.

* * * * *